United States Patent
Taranta, II et al.

(10) Patent No.: US 9,323,616 B2
(45) Date of Patent: Apr. 26, 2016

(54) ACCELERATED DATA RECOVERY USING A REPEATING STRIPE GROUP ARRANGEMENT

(71) Applicant: Xyratex Technology Limited, Hampshire (GB)

(72) Inventors: Eugene Mathew Taranta, II, Casselberry, FL (US); Stephen F. O'Neil, Corona, CA (US)

(73) Assignee: Xyratex Technology Limited, Havant, Hampshire (GB)

( * ) Notice: Subject to any disclaimer, the term of this patent is extended or adjusted under 35 U.S.C. 154(b) by 0 days.

(21) Appl. No.: 14/221,102

(22) Filed: Mar. 20, 2014

(65) Prior Publication Data

US 2015/0269022 A1 Sep. 24, 2015

(51) Int. Cl.
*G06F 11/00* (2006.01)
*G06F 11/10* (2006.01)

(52) U.S. Cl.
CPC ........ *G06F 11/1076* (2013.01); *G06F 11/1008* (2013.01); *G06F 11/1092* (2013.01)

(58) Field of Classification Search
CPC ... G06F 11/1076; G06F 3/0619; G06F 3/064; G06F 3/0689
See application file for complete search history.

(56) References Cited

U.S. PATENT DOCUMENTS

| | | | |
|---|---|---|---|
| 5,490,248 A * | 2/1996 | Dan et al. | 714/6.22 |
| 5,574,855 A * | 11/1996 | Rosich et al. | 714/41 |
| 5,884,098 A * | 3/1999 | Mason, Jr. | 710/52 |
| 6,112,277 A * | 8/2000 | Bui et al. | 711/114 |
| 6,718,434 B2 * | 4/2004 | Veitch et al. | 711/114 |
| 7,293,138 B1 * | 11/2007 | Mahmoud | 711/114 |
| 7,496,724 B2 * | 2/2009 | Ogawa | G06F 3/0613 711/114 |
| 7,958,304 B1 * | 6/2011 | Goel et al. | 711/114 |
| 8,140,860 B2 * | 3/2012 | Haswell | 713/193 |
| 8,453,036 B1 * | 5/2013 | Goel | G06F 11/1096 714/763 |
| 8,627,181 B1 * | 1/2014 | Ito | 714/773 |
| 9,244,769 B2 * | 1/2016 | Colgrove | G06F 11/1076 |
| 2006/0100982 A1 * | 5/2006 | Cohn | 707/1 |
| 2009/0083589 A1 * | 3/2009 | Fulton et al. | 714/48 |
| 2009/0204846 A1 | 8/2009 | Baloun et al. | |

OTHER PUBLICATIONS

David A. Patterson et al., "A Case of Redundant Arrays of Inexpensive Disks (RAID)," University of California, Berkley, pp. 109-116, ACM SIGMOD Conference (1988).

(Continued)

*Primary Examiner* — Esaw Abraham
(74) *Attorney, Agent, or Firm* — Hall Estill Attorneys at Law

(57) ABSTRACT

A method of defining a layout mapping function for a parity distributed RAID array including a plurality of target objects, the layout mapping function defining the mapping of the group-address space to the target-address space in the array and including a matrix defining a unit space across a plurality of target objects, the matrix Includes columns defining the target objects and rows defining equally-offset sequential units on the target objects, the method including: a) defining, on a computing apparatus, a layout of stripe groups across the target objects by defining a pattern including a plurality of stripe groups into a predetermined pattern and repeating the pattern across the matrix, each stripe group including a plurality of data units and a plurality of parity units; and b) implementing, on a computing apparatus, the layout on the target objects of the RAID array.

20 Claims, 9 Drawing Sheets

(56) References Cited

OTHER PUBLICATIONS

Arif Merchant et al., "Analytic Modeling of Clustered RAID with Mapping Based on Nearly Random Permutation," IEEE Transaction on Computers, vol. 45, No. 3, pp. 367373 (Mar. 1996).

Mark Calvin Holland, "On-Line Data Reconstruction in Redundant Disk Arrays," PhD. Thesis, Carnegie Mellon University, pp. Title-240 (1994).

Auillermo A. Alvarez, Walter A. Burkhard & Flaviu Cristian, Tolerating Multiple Failures in RAID Architectures with Optimal Storage and Uniform Declustering, Computer Architecture, 1997, Conference Proceedings The 24th Annual International Symposium, IEEE, Jun. 2, 1997, pp. 62-72, US.

John Fragalla, "Improving Lustre OST Performance with ClusterStor GridRAID," Stanford Conference and Exascale Workshop 2014, Feb. 7, 2014, URL:https://www.youtube.com/watch?v=z05DYsbhy9U (retrieved from the Internet on Oct. 8, 2015 by the EPO Examiner).

Mark Calvin Holland, "On-line data reconstruction in redundant disk arrays," Jan. 1, 1994, URL:http://search.proquest.com/docview/304089349 (retrieved from the Internet on Oct. 19, 2015 by the EPO Examiner).

Arif Merchang and Phillip S. Yu, "Analytic Modeling of Clustered RAID with Mapping Based on Nearly Random Permutation," IEEE Transactions on Computers, IEEE Service Center, vol. 45, No. 3 Mar. 1, 1996, pp. 367-373, Los Alamitos, California, US.

\* cited by examiner

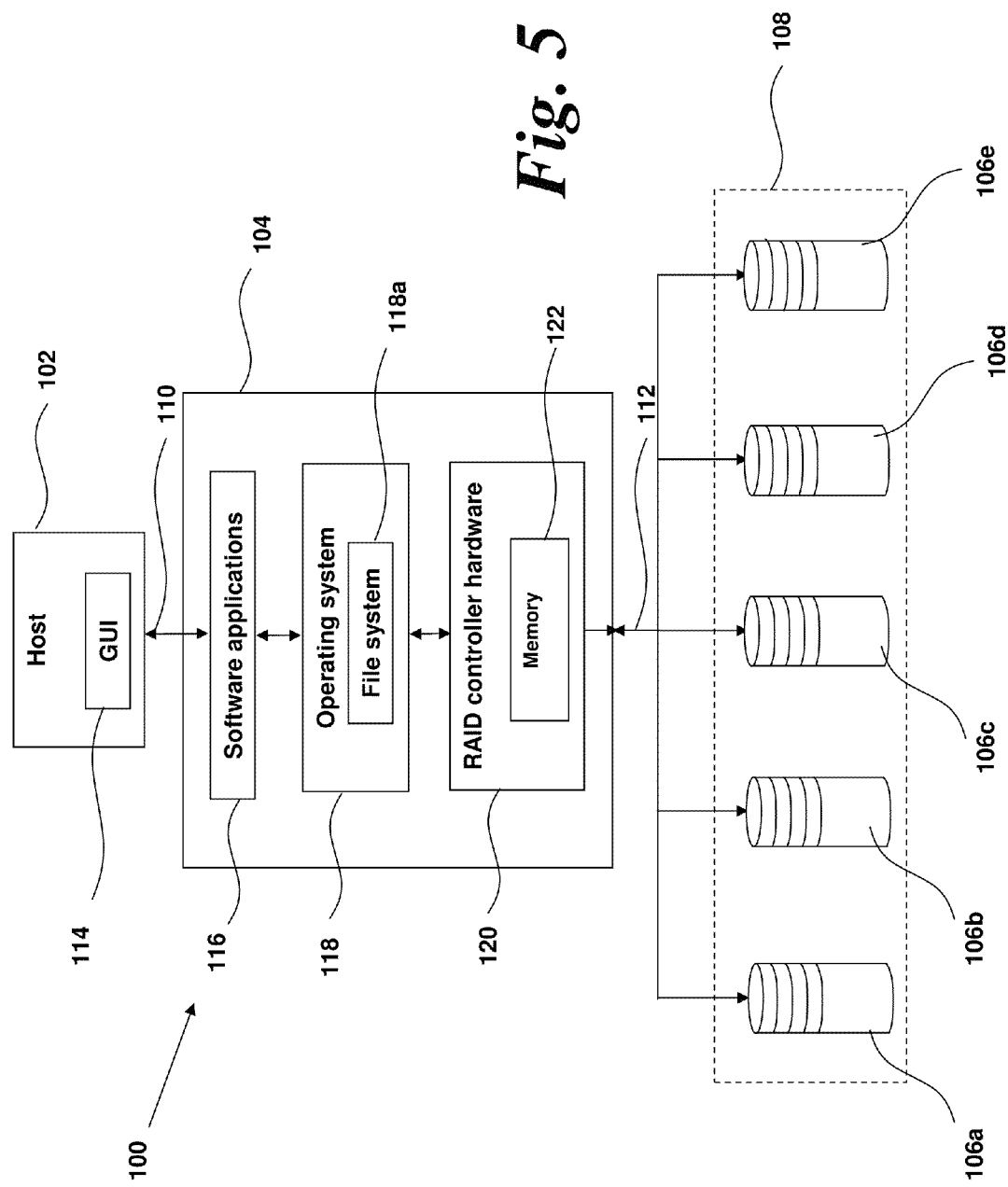

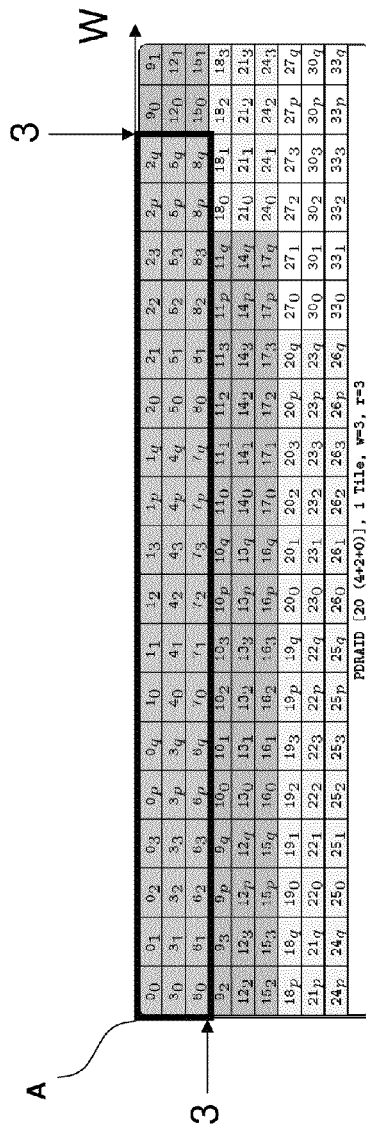

ACCELERATED DATA RECOVERY USING A REPEATING STRIPE GROUP ARRANGEMENT

The present invention relates to a method of, and apparatus for, accelerated data recovery in a storage system.

Performance and data integrity are core requirements for modern storage systems. The ability to prevent and, if necessary, identify and correct data errors and corruptions is essential for operation of storage systems ranging from a simple hard disk drive up to large mainframe storage arrays.

One approach to improve the reliability and performance of a hard disc drive storage system is to employ redundant arrays of inexpensive disks (RAID), also sometimes referred to as redundant arrays of independent disks. RAID arrays are employed as the primary storage architecture for large, networked computer storage systems.

The RAID architecture was first disclosed in "A Case for Redundant Arrays of Inexpensive Disks (RAID)", Patterson, Gibson, and Katz (University of California, Berkeley). RAID architecture combines multiple small, inexpensive disk drives into an array of disk drives that yields performance exceeding that of a single large drive.

There are a number of different RAID architectures, designated as RAID-1 through RAID-6. Each architecture offers disk fault-tolerance and offers different trade-offs in terms of features and performance. In addition to the different architectures, a non-redundant array of disk drives is referred to as a RAID-0 array. RAID controllers provide data integrity through redundant data mechanisms, high speed through streamlined algorithms, and accessibility to stored data for users and administrators.

RAID architectures provide data redundancy in two basic forms: mirroring (RAID 1) and parity (RAID 3, 4, 5 and 6). The implementation of mirroring in RAID 1 architectures involves creating an identical image of the data on a primary disk on a secondary disk. The contents of the primary and secondary disks in the array are identical. RAID 1 architecture requires at least two drives and has increased reliability when compared to a single disk.

RAID 3, 4, 5, or 6 architectures generally utilize three or more disks of identical capacity. In RAID 3 or 4 architectures, two or more of the disks are utilized for reading/writing of data and one or more of the disks store parity information. RAID 5 and 6 architectures comprise "distributed parity" architectures in which the data and parity data are interleaved across the disks.

Data interleaving across the disks is usually in the form of data "striping" in which the data to be stored is broken down into stripe groups comprising a plurality of blocks called "stripe units". The "stripe units" are then distributed across the disks.

Therefore, should one of the disks in a RAID group fail or become corrupted, the missing data can be recreated from the data on the other disks. The data may be reconstructed through the use of the redundant "stripe units" stored on the remaining disks. RAID 5 and 6 arrangements are particularly robust with regard to drive failure.

FIG. 1 shows a plurality of disk drives 10a-e forming a RAID 6 array 12. In FIG. 1, five drives are shown. However, any suitable number could be used. Each disk drive 10a-e can be accessed through a RAID controller to read/write data.

As shown in FIG. 1, data is stored on the RAID 6 array 108 in the form of stripe groups comprising stripe units. Each stripe group A, B comprises five separate stripe units—stripe A comprises stripes A1, A2, A3, $A_p$ and $A_q$. Stripe B comprises stripe units B1, B2, B3, $B_p$ and $B_q$. Therefore, the stripe units comprising each stripe (A1-A3 or B1-B3 respectively) are distributed across a plurality of disk drives, together with parity information $A_p$ and $A_q$ and $B_p$ and $B_q$ respectively. This provides data redundancy.

The arrangement, format, parameters and configuration of the particular stripe units across the drives of a RAID array is known as the layout. The layout may include, non-exhaustively, RAID array configuration parameters such as, for example, information on the distribution of particular stripe groups, the number and size of the stripe units within those stripe groups, the size of the checksum symbols.

As shown in FIG. 1, each stripe unit in a stripe group is mapped to a different storage component in the array as a contiguous chunk of data. To map each stripe unit to a disk storage component creates two desirable properties. Firstly, most common I/O workloads can be parallelized across the storage components 10a-e forming the RAID array 12. Secondly, should a storage 5 component fail, only one stripe unit in a stripe group will affected, aiding recovery.

Some stripe units in a stripe group will store data whereas others will store redundancy (checksum) parity information. Further, some implementations may reserve stripe units as distributed spare space inside of the RAID array for the purpose of accelerated recovery from storage component failures.

How the data and parity information stripe units are distributed across the drives in an array is a function of the particular RAID software and is known as the layout. There are numerous strategies for how to layout data. In many cases, the layout is selected to eliminate areas of particularly high activity on the array and maximize performance of the array.

However, an issue can arise during recovery of a failed drive in a RAID array having a conventional distribution of stripe units such as shown in FIG. 1. Assuming that each drive is equally loaded, a drive failure may double the load on each surviving drive, leading to significant performance degradation during recovery. This is because the surviving drives are accessed to regenerate data for the missing drive together with the standard client accesses to the RAID array.

A known technique to mitigate this issue is parity declustering. Parity declustered RAID (PDRAID) is a technique which, in the event of a drive failure, reduces the amount of work for each surviving drive. An example of this is described in "*Analytic modeling of clustered RAID with mapping based on nearly random permutation.*", Merchant, Arif, and Philip S. Yu, Computers, IEEE Transactions on 45.3 (1996): 367-373.

Merchant and Yu's approach is to combine stripe groups into small matrix layouts. An example of such a matrix is shown in FIG. 2. Each matrix is arranged such that the number of columns is equal to the number of hard drives in the array (i.e. the drive count).

The columns are then divided into rows of equally offset units across those hard drives. A unit is a fixed width block of contiguously addressed information that is measured in bytes. Units are analogous to chunks and in PDRAID all units are of equal length. In practice, the unit size is equal to the chunk size of the array.

Units may contain data or parity information, or may be reserved as spare space. The set of all units in a configuration are enumerated and ordered; this set is referred to as the unit-address space. A configuration containing U units is as follows:

Unit-address space=$\{0, 1, 2, \ldots U-1\}$.

A further criterion imposed is that the final stripe-group ends on the last drive. The number of rows in the matrix is then the least common multiple of the drive count and the stripe width, divided by the drive count.

FIG. 2 shows an exemplary matrix illustrating an arrangement comprising 15 hard drives. The data is arranged in a plurality of stripe groups. Each stripe group has a stripe width equal to the total number of units in the stripe group. In the example of FIG. 2, the stripe groups are arranged in a 5+2 configuration, meaning that for every stripe group there are 5 data units and 2 parity units.

The example of FIG. 2 is comprised of 15 stripe-groups and is the minimum number of stripe-groups that a) spans all drives and b) ends on a row boundary (the last 'Q' unit of stripe group 14 lands on the last drive). Because stripe-groups are mapped sequentially over the matrix space, it is ensured that each unit in a stripe-group maps to a different hard drive. Therefore, if any one hard drive fails, then at most one unit in any stripe-group is lost.

It is possible to utilize different layouts within a matrix as described, whilst maintaining the benefits of the above system. First referring back to FIG. 2, it is noted that each unit in the first column belongs to a different stripe group.

Therefore, it is safe to permute columns of the matrix without fear of landing two units of the same stripe group onto the same hard drive. In other words, each column is pseudo-randomly assigned to a particular drive such that the sequence of data down each column (i.e. on any given hard drive) remains the same, but that the particular hard drive to which that data sequence is assigned can be varied according to a pseudo-random computation.

FIG. 3 shows an alternative matrix layout utilizing this approach. In a full configuration, each matrix is permuted uniquely according to a pseudo-random permutation selection procedure.

A number of rules exist which place certain bounds on the layout of a RAID array. One example of this is known as the layout goodness criteria as set out in "*On-Line Data Reconstruction In Redundant Disk Arrays*", PhD thesis, M. C. Holland, Carnegie Mellon University (1994). These criteria are the single failure correcting, distributed recovery workload, distributed parity, computationally efficient mapping, large write optimized, and maximized parallelization criteria.

The known arrangements described above present practical solutions to parity declustered layouts. However, they may pose issues with regard to recovery of data after loss, corruption or drive failure.

When a drive in a RAID array fails, the time required to repair the RAID array, e.g. to rebuild the lost data on a spare hot drive, is critical. Therefore, the mean time to repair (MTTR) is an important reliability metric of a RAID-based storage system.

A faster recovery time means that a storage system can tolerate a higher frequency of failures. As a result, the overall mean time to failure (MTTF) is also improved. MTTR is affected directly by repair performance and is comprised, in part, of disk access throughput, storage-bus bandwidth, and computational complexity (e.g. encode-decode logic, RAID logic, etc). Therefore, drive performance during recovery is critical to achieving a short MTTR.

A hard disk drive performs best when its workload is sequential. Many modern hard disks provide sequential workload optimizations, such as read ahead caching to a read ahead storage buffer. Therefore, during data access or recovery, an individual hard drive in the array may operate under one of the following three conditions:
1) No read ahead occurs;
2) Read ahead is triggered but the majority of the buffer is wasted; or
3) Read ahead occurs and is utilized.

The first case is when individual units, spaced apart on the hard drive, are accessed as part of a read or rebuilding operation. In this situation, no read ahead can be utilized.

The second case is where units to be read are grouped in small clusters. Read ahead can occur, but is limited due to the size of the clusters of units being read. Therefore, the capacity of the read ahead buffer is not fully utilized and the performance is not optimized.

The third case is where units to be read are clustered in such an arrangement that the data units can utilize read ahead and make full use of the capability of the read ahead storage buffer. The ability to utilize fully the capabilities of the read ahead buffer means that, under these conditions, the requisite units on the hard drive can be accessed much more quickly than under the first two conditions.

However, the above PDRAID configurations are not conducive to optimization of read ahead buffering and so recovery of such drives is relatively slow. In a PDRAID layout, the recovery workload does not access all data. Therefore, the recovery workload can appear to be more scattered than for sequential client IO. In practice, this means that recovery is especially subject to the issues presented by cases 1 and 2 above. FIG. 4 provides an example of this issue.

FIG. 4 shows a 35 hard drive, 8+2 PDRAID arrangement in accordance with the above-described PDRAID pseudo-random arrangement. In this example, hard drive 4 has failed (as shown by the dark column). To reconstruct the data on the failed drive 4, it is necessary to access all of the units highlighted in grey.

As can be seen from FIG. 4, the data access pattern for reconstruction is highly scattered. Looking down a given column (which represents the units on a particular hard drive), the units which must be accessed to reconstruct the data are arranged either in small clusters or stand alone. In other words, the recovery workload is incoherent.

Consequently, full buffered read ahead of sequential data access (i.e. condition 3 above) cannot be fully utilized and so the majority of the hard drives used in the data reconstruction are operating in regime 1) or 2) (i.e. no or incomplete read ahead). As a result, there is little performance gain to be had from the read ahead technology as a result of rate-limiting parallel accesses in the reconstruction workload.

Therefore, based on the above, the present invention acknowledges, for the first time, that known PDRAID configurations are incapable of providing a data configuration in which reconstruction and recovery data access is optimized.

Known arrangements do not suggest a strategy for coherent access to hard drives forming a part of an array in order to take advantage of disk read ahead potential with respect to repair and rebuild.

Embodiments of the present invention seek to address this issue.

According to a first aspect of the present invention, there is provided a method of defining a layout mapping function for a parity distributed RAID array comprising a plurality of target objects, the layout mapping function defining the mapping of the group-address space to the target-address space in the array and comprising a matrix defining a unit space across a plurality of target objects, the matrix comprises columns defining said target objects and rows defining equally-offset sequential units on said target objects, the method comprising: a) defining a layout of stripe groups across the target objects by defining a pattern comprising a plurality of stripe groups into a predetermined pattern and repeating said pattern across said matrix, each stripe group comprising a plurality of data units and a plurality of parity units; and b) implementing said layout on said target objects of said RAID array.

In one embodiment, said pattern is defined by a width parameter W, said width parameter specifying the number of stripe groups to be distributed across said columns of said matrix before said pattern is repeated into the subjacent row.

In one embodiment, said width parameter is greater than 1.

In one embodiment, said width parameter is selected as the integer of the number of target objects divided by the number of units in a stripe group.

In one embodiment, said pattern is defined by a repeat parameter R, said repeat parameter specifying the number of stripe groups to be distributed sequentially down said rows of said matrix before traversing "horizontally" to the next set of columns in said matrix.

In one embodiment, said repeat parameter is greater than 1.

In one embodiment, said repeat parameter is greater than 8.

In one embodiment, said target objects comprise hard drives forming part of the RAID array and said repeat parameter is set based on a parameter equal to the read ahead disk size of one or more hard drives divided by the size of the units on said one or more hard drives.

In one embodiment, said target objects comprise hard drives forming part of a RAID array.

In one embodiment, prior to step b), the method further comprises: c) permuting said columns to assign different columns to different target objects.

In one embodiment, in step c) said permutation involves pseudo-random permutation.

In one embodiment, each of said patterns comprises two or more stripe groups.

According to a second aspect of the present invention, there is provided apparatus operable to define a layout mapping function for a parity distributed RAID array comprising a plurality of target objects, the layout mapping function defining the mapping of the group-address space to the target-address space in the array and comprising a matrix defining a unit space across a plurality of target objects, the matrix comprises columns defining said target objects and rows defining sequential units on said target objects, the computing apparatus being operable to: a) define a layout of stripe groups across the target objects by defining a pattern comprising a plurality of stripe groups into a predetermined pattern and repeating said pattern across said matrix, each stripe group comprising a plurality of data units and a plurality of parity units; and b) implement said layout on said target objects of said RAID array.

In one embodiment, said width parameter is greater than 1.

In one embodiment, said width parameter is selected as the integer of the number of target objects divided by the number of units in a stripe group.

In one embodiment, said pattern is defined by a repeat parameter, said repeat parameter specifying the number of stripe groups to be distributed sequentially down said rows of said matrix before said pattern is repeated.

In one embodiment, said repeat parameter is greater than 1.

In one embodiment, said target objects comprise hard drives forming part of a RAID array.

In one embodiment, prior to step b), the apparatus is further operable to:

c) permute said columns to assign different columns to different target objects.

According to a third aspect of the present invention, there is provided non-transitory computer readable storage medium having stored thereon a computer program product executable by a programmable processing apparatus, comprising one or more software portions for performing the steps of the first aspect.

Embodiments of the present invention will now be described in detail with reference to the accompanying drawings, in which.

Figures 3, 4:
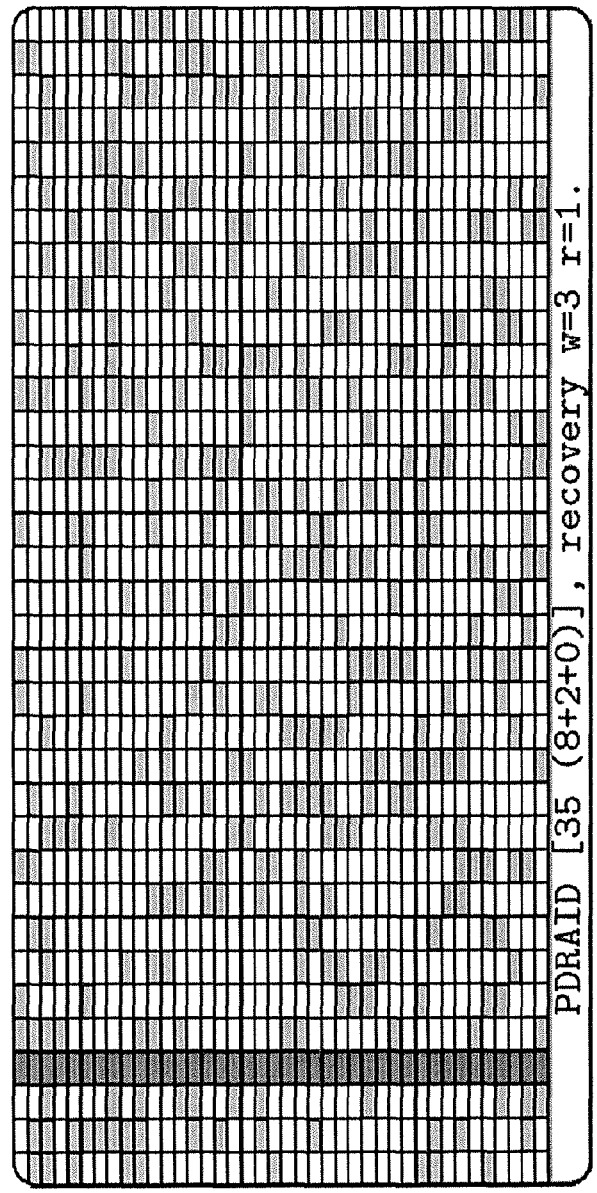
FIG. 3 is a schematic diagram showing the matrix arrangement of FIG. 2 in which the data columns have been permuted according to a pseudo-random code.
Figure 10:
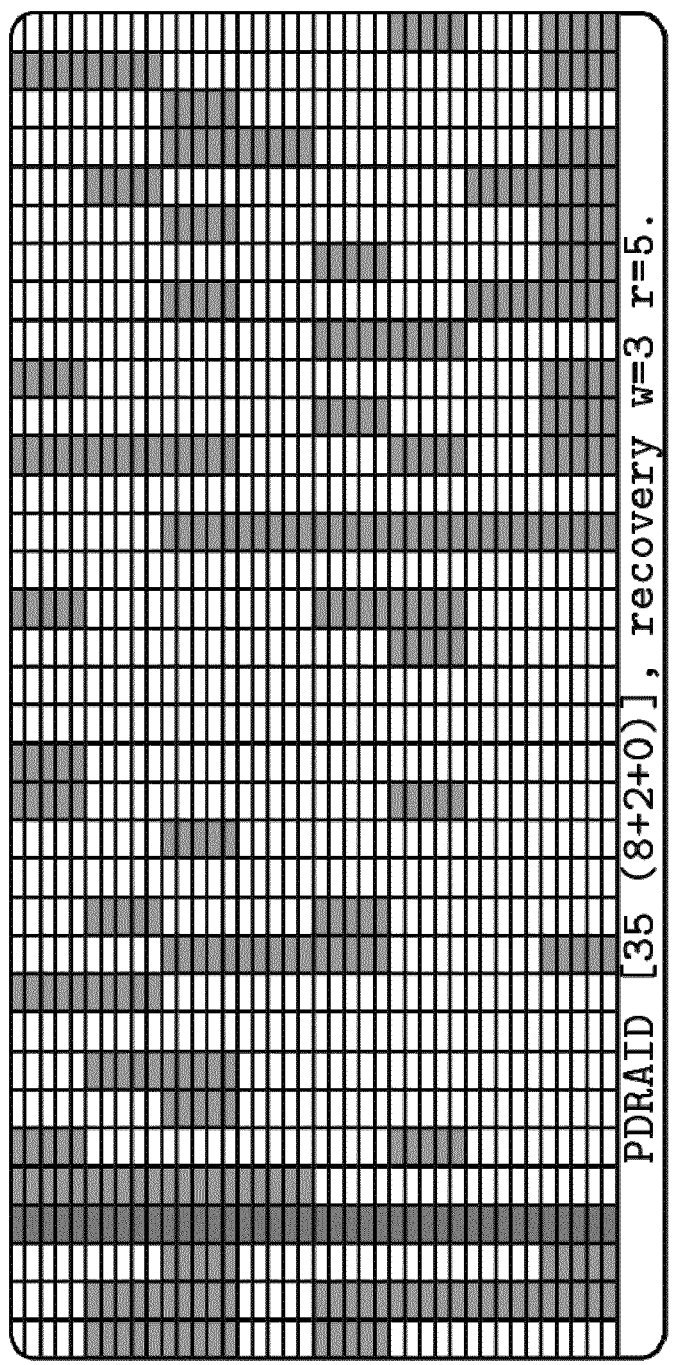
Figure 11:
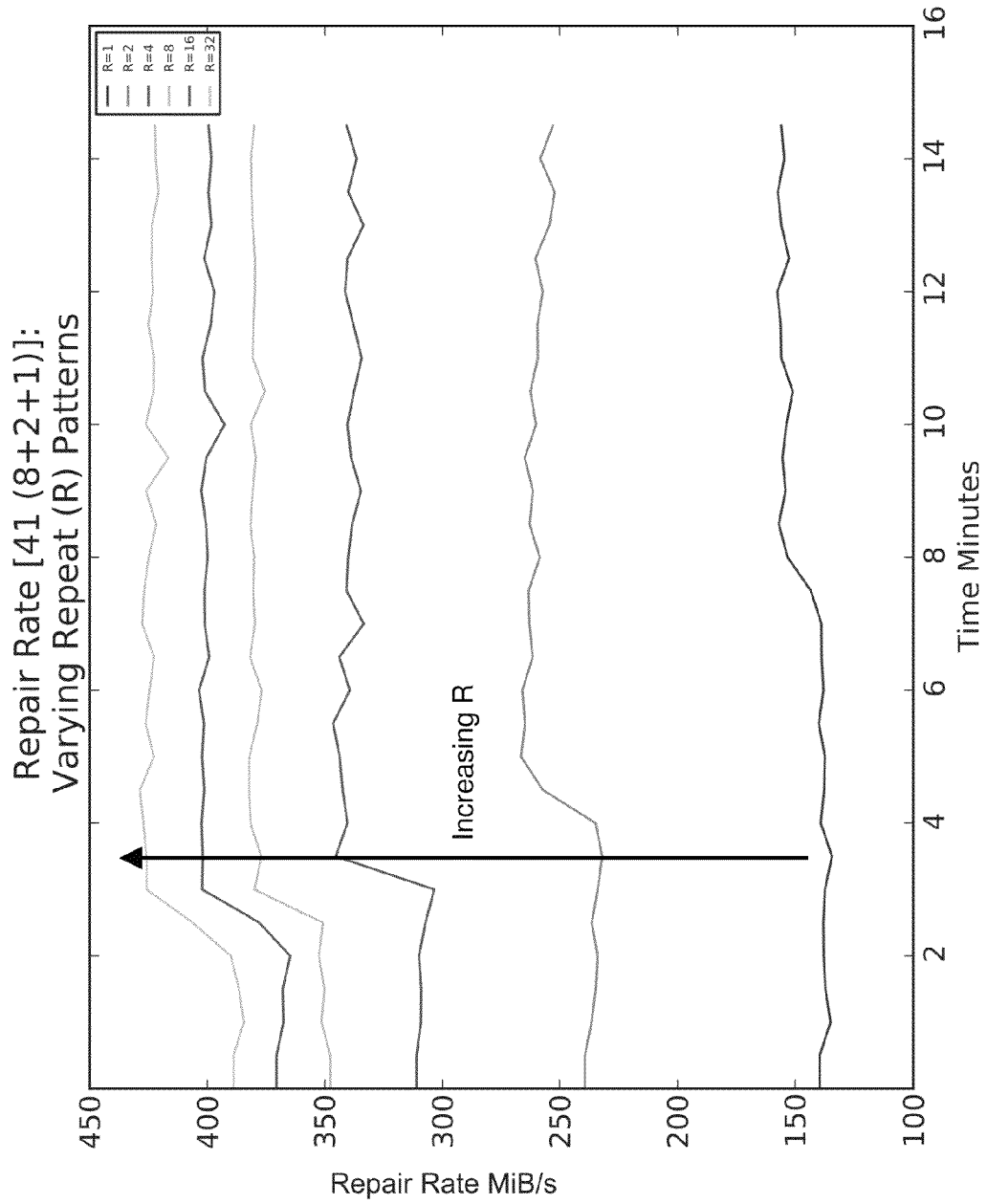
Figure 12:
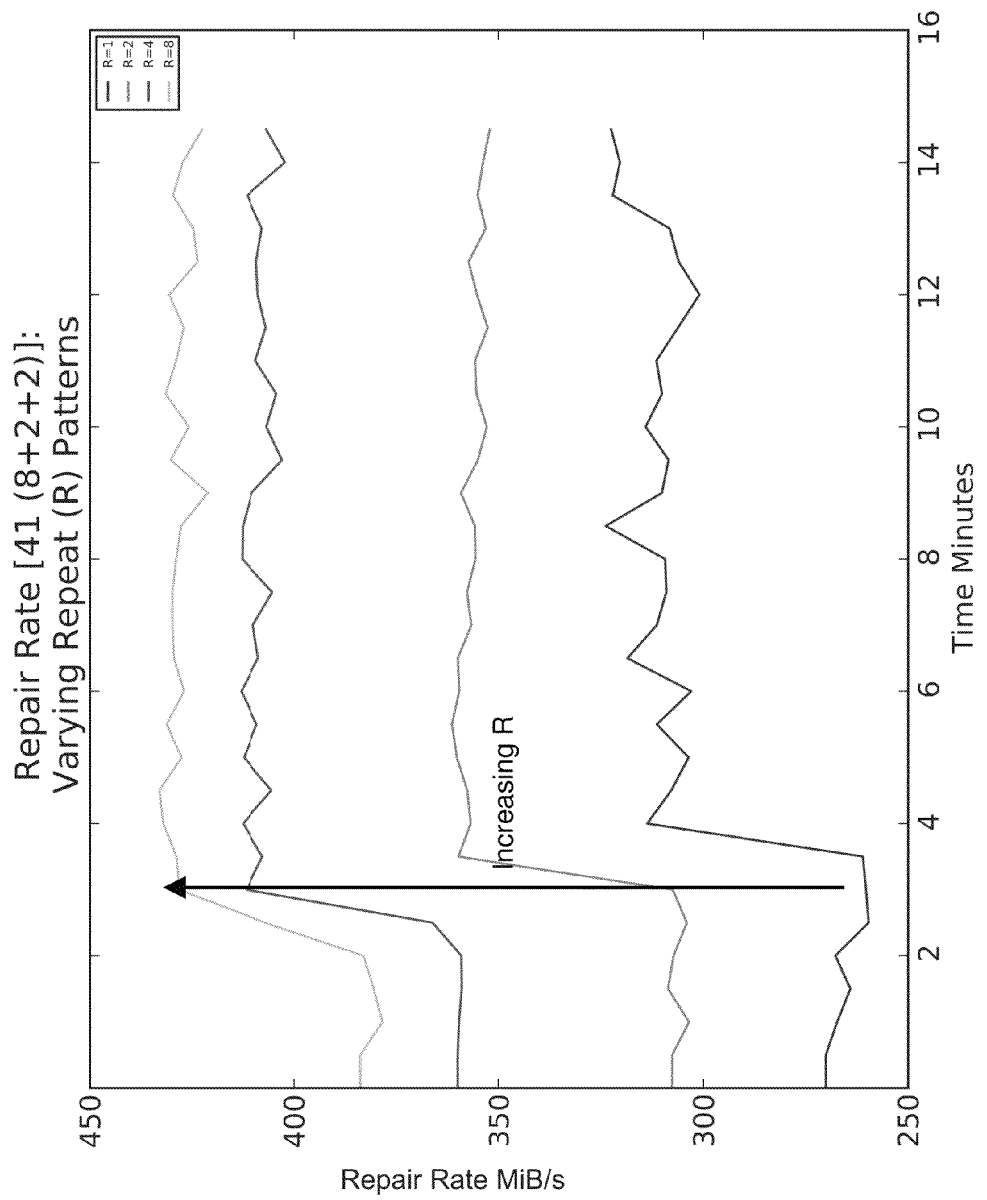
Figure 13:
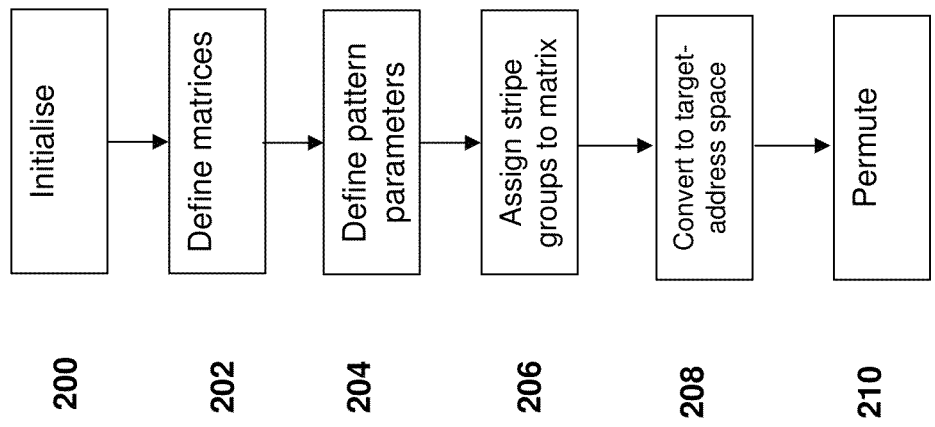

FIG. 4 illustrates an exemplary RAID array in which a single drive has failed. The failed drive is denoted by the dark line. Grey units are the units on the surviving hard drives which need to be accessed in order to rebuild the failed drive;

FIG. 5 is a schematic diagram showing a RAID controller suitable for use with an embodiment of the present invention;

FIG. 6 is a schematic diagram showing a matrix arrangement illustrating the data layout on a RAID array in accordance with an embodiment of the present invention, where the parameters for the matrix are W=3 and R=3;

FIG. 7 is a schematic diagram showing an alternative matrix arrangement illustrating the data layout on a RAID array in accordance with an embodiment of the present invention, where the parameters for the matrix are W=1 and R=5;

Figures 8, 9:
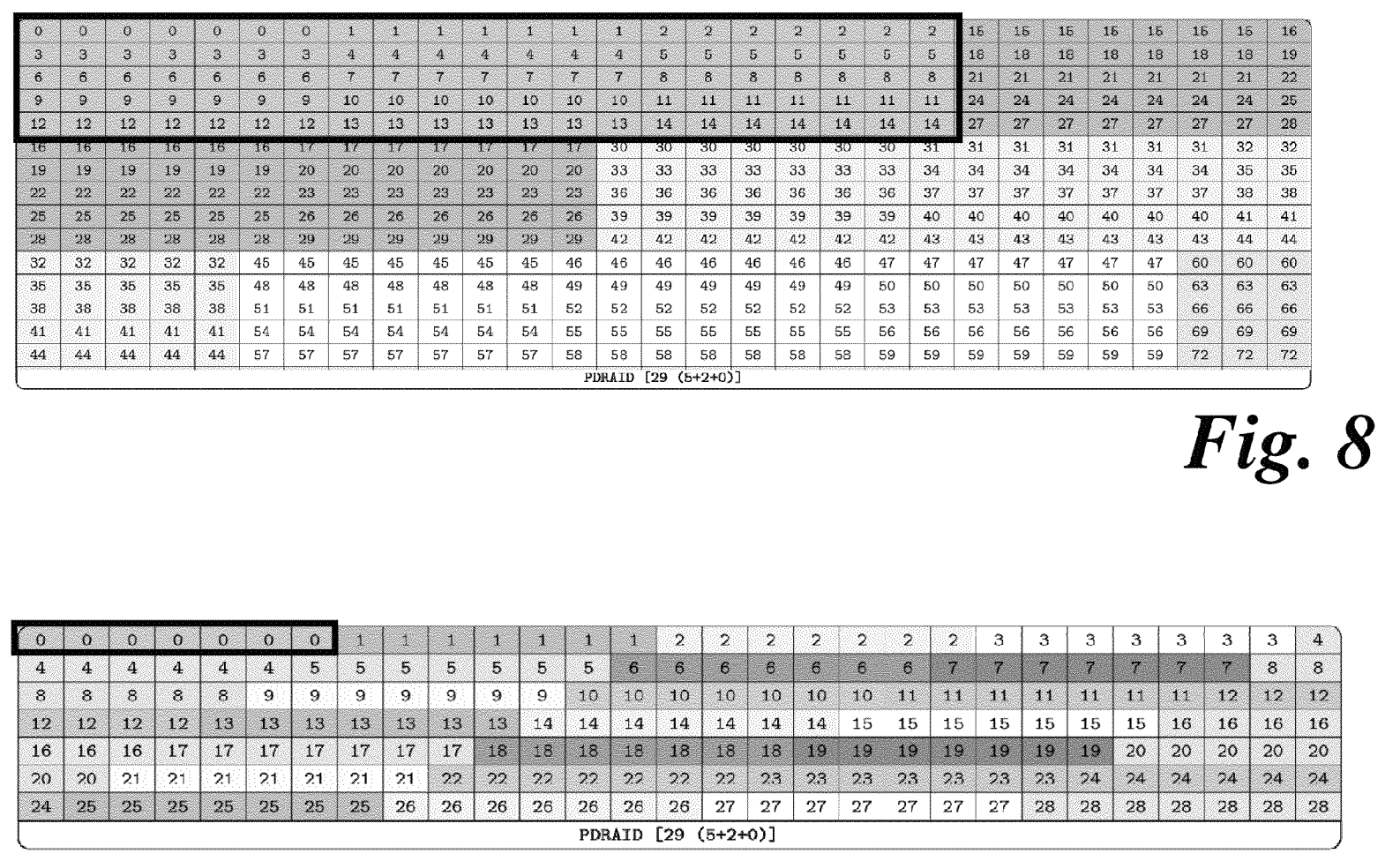

FIG. 8 is a schematic diagram showing a further alternative matrix arrangement illustrating the data layout on a RAID array in accordance with an embodiment of the present invention where the parameters for the matrix are W=3 and R=5;

FIG. 9 is a schematic diagram showing a matrix arrangement illustrating a known data layout on a RAID array where the parameters for the matrix are W=1 and R=1;

FIG. 10 illustrates an exemplary RAID array in which a single drive has failed. The failed drive is denoted by the dark line. Grey units are the units on the surviving hard drives which need to be accessed in order to rebuild the failed drive;

FIG. 11 is a graph showing test data on the effect of the configuration parameter R on the repair rate of a RAID array for a [41(8+2+1)] configuration system;

FIG. 12 is a graph similar to FIG. 11 showing test data on the effect of the configuration parameter R on the repair rate of a RAID array for a [42(8+2+2)] configuration system; and FIG. 13 is a flowchart illustrating a method in accordance with an embodiment of the present invention.

The present invention aims to rearrange the layout of a RAID array so that read ahead can be leveraged uniformly. A modification to known nearly random permutations algorithm is applied which enables stripe-groups to be distributed in a manner that improves the sequentiality of the recovery workload and thus reduces MTTR and, consequently, increases MTTF.

FIG. 5 shows a schematic diagram of a storage resource 100 that may be used with the present invention. The storage resource 100 comprises a host 102, a RAID controller 104, and storage devices 106a, 106b, 106c, 106d and 106e which, together, form part of a RAID 6 array 108.

The host 102 is connected to the RAID controller 104 through a communication network 110 such as an Ethernet and the RAID controller 104 is, in turn, connected to the storage devices 106a-e via a storage network 112 such as an iSCSI network.

The host 102 comprises a general purpose computer (PC) which is operated by a user and which has access to the storage resource 100. A graphical user interface (GUI) 114 is run on the host 102. The GUI 114 is a software application which acts as a user interface for a user of the host 102.

The RAID controller 104 comprises a software application layer 116, an operating system 118 and RAID controller hardware 120. The software application layer 116 comprises software applications including the algorithms and logic necessary for the initialisation and run-time operation of the RAID controller 104. The software application layer 116 includes software functional blocks such as a system manager for fault management, task scheduling and power management. The software application layer 116 also receives commands from the host 102 (e.g., assigning new volumes, read/write commands) and executes those commands. Commands that cannot be processed (because of lack of space available, for example) are returned as error messages to the user of the host 102.

The operation of the RAID controller 104 may be set at the Application Programming Interface (API) level. Typically, Original Equipment Manufactures (OEMs) provide RAID networks to end users for network storage. OEMs generally customize a RAID network and tune the network performance through an API.

The operating system 118 utilizes an industry-standard software platform such as, for example, Linux, upon which the software applications forming part of the software application layer 116 can run. The operating system 118 comprises a file system 118a which enables the RAID controller 104 to store and transfer files and interprets the data stored on the primary and secondary drives into, for example, files and directories for use by the operating system 118.

The RAID controller hardware 120 is the physical processor platform of the RAID controller 104 that executes the software applications in the software application layer 116. The RAID controller hardware 120 comprises a microprocessor, memory 122, and all other electronic devices necessary for RAID control of the storage devices 106a-e.

The storage devices 106 may take any suitable form; for example, tape drives, disk drives, non-volatile memory, or solid state devices. Although most RAID architectures use hard disk drives as the main storage devices, it will be clear to the person skilled in the art that the embodiments described herein apply to any type of suitable storage device. More than one drive may form a storage device 106; for example, a RAID array of drives may form a single storage device 106. The skilled person will be readily aware that the above features of the present embodiment could be implemented in a variety of suitable configurations and arrangements.

As set out above, the term "storage device" in the context of the following description may refer to a logical drive which is formed on the RAID array 108. In this case, a sector refers to a portion of the logical drive created on the RAID array 108. The following embodiment of the present invention is applicable to any of the above described arrangements.

In this embodiment, the storage devices 106 are formatted such that each sector comprises 512 bytes (4096 bits). The term "sector" used herein is generally applicable to any sector sizes. Therefore, the term "sector" is merely intended to indicate a portion of the storage availability on a storage device and is not intended to be limited to any of the disclosed examples. Additionally, sector may be used to refer to a portion of a logical drive, i.e. a virtual drive created from a plurality of physical hard drives linked together in a RAID configuration.

Figures 1, 2:
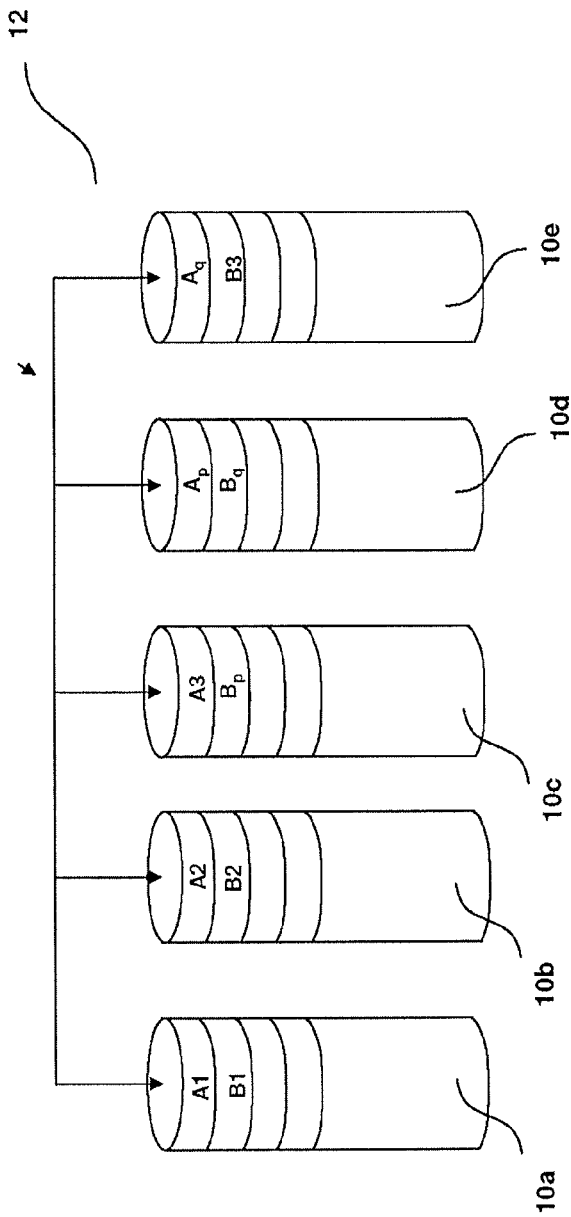
FIG. 1 is a schematic diagram of a known RAID array.
FIG. 2 is a schematic diagram showing a known matrix arrangement illustrating the data layout on a RAID array.

Further, whilst only a single server and RAID array is shown in FIG. 2, any number of RAID controllers 104 may be provided to serve any number of storage devices forming an array.

The RAID controller 104 stores configuration metadata for the RAID array 108. This denotes the configuration of data storage on the RAID array 108 as described above. The present invention is concerned with improved arrangements of data configuration as will be described below.

The following embodiment of the invention may be utilized with the above RAID arrangement. In the following description, for brevity, a single storage device 106a will be referred to. However, the embodiment of the invention is equally applicable to other arrangements; for example, the storage device 106a may be a logical drive, or may be a single hard disk drive.

The configuration of the data on the RAID array 108 is governed by the configuration data as set out in one or more matrices. The present invention seeks to provide matrix configurations in which the benefits of PDRAID are preserved, but under which recovery can occur much more quickly by taking advantage of the properties of modern hard disk drives.

In the context of the present invention, a matrix represents a part of a layout mapping function for the RAID array. The following parameters as utilized by the present invention will be described below.

A unit is the smallest block of information handled by the matrix. As described above, a unit is a fixed width block of contiguously addressed information that is measured in bytes. Units are analogous with chunks and in PDRAID all units are of equal length. Units may contain data or parity information, or may be reserved as sparing space. The set of all units in a configuration are enumerated and ordered; this set is referred to as the unit-address space.

A target object is a storage entity (in this embodiment, a hard drive) that is divided into "frames". The capacity of a frame is equal to unit length and as such a frame stores precisely one unit of information. A pool is a collection of target objects. There are P target objects in a pool.

A stripe group is a set of data units and parity units. Each unit in a stripe group is identified as a (group number, unit number) ordered pair. The set containing all stripe groups is lexicographically ordered and is called the group-address space. For example, a configuration containing groups comprised of N+K=3 units per group is ordered as follows:

Group-address space={(0,0), (0,1), (0,2), (1,0), (1,1), (1,2) . . . }

Frames inside of a target object are ordered, as are the target objects of a pool. Therefore, an arbitrary frame can be identified as an ordered pair: (frame number, target number). The set containing all frames from all target objects is also lexicographically ordered and is named the target-address space:

Target address space={(0,0), (0,1), (0,2), (0,3), (1,0), (1,1), (1,2), (1,3), (2,0), (2,1), (2,2), (2,3), . . . }.

An example is shown in Table 1 below:

TABLE 1

| Target 0 | Target 1 | Target 2 | Target 3 |
| --- | --- | --- | --- |
| frame 0 | frame 0 | frame 0 | frame 0 |
| frame 1 | frame 1 | frame 1 | frame 1 |
| frame 2 | frame 2 | frame 2 | frame 2 |
| . . . | . . . | . . . | . . . |

To compare, when the target address space is thought of as an array of frame rows and target columns, then the set is row-major ordered.

The unit-address space is laid out sequentially over the target-address space and therefore the target-address space can be redrawn as follows:

TABLE 2

| Target 0 | Target 1 | Target 2 | Target 3 |
|----------|----------|----------|----------|
| unit 0   | unit 1   | unit 2   | unit 3   |
| unit 4   | unit 5   | unit 6   | unit 7   |
| unit 8   | unit 9   | unit 10  | unit 11  |
| ...      | ...      | ...      | ...      |

A layout is then the mapping of the stripe group-address space to the target-address space. In other words, each (group number, unit number) element maps to a unique (frame number, target number) element. The matrix construct is then used as part of the layout function.

For the purposes of the present invention, a PDRAID array configuration is denoted as set out in expression 1):

$$[P(N+K+A)R \times W] \quad (1)$$

where P is the number of target devices in the array, N is the number of data units per stripe-group, K is the number of parity units per stripe-group, and A is the number of distributed spares.

Distributed spares are spare space which is pseudo-randomly distributed within the matrix configuration. Whilst embodiments and implementations utilizing distributed spares are intended to fall within the scope of the present invention, for brevity they will not be described further here. Therefore, for the purposes of the following exemplary embodiments, A will be set to zero.

The parameters R and W are aspects of the present invention which enable efficient optimization of a RAID configuration.

These parameters are used to define the matrix layout as part of the present invention.

One aspect of the present invention is to map stripe-groups across the hard drives in a matrix in sequential patterns to enable efficient access to the data in the event of a drive failure requiring a rebuilding operation. In other words, a set of stripe groups is mapped into the matrix space in a given pattern and then the pattern is repeated sequentially on disk, so that stripe-groups are effectively stacked.

Parameter W is known as the width and represents how many stripe-groups are laid out along the columns across the matrix before the pattern is repeated.

Parameter R is the repeat count, and specifies along how many rows the pattern is to be repeated.

Therefore, parameters W and R can be likened to X and Y axes of a matrix respectively, with the value of W for a given pattern denoting how many sequential stripe groups extend in the "X axis" of the pattern and the value of R determining how many stripe groups extend in the "Y-axis" of the pattern. Thus, the total number of stripe groups in a given pattern is equal to W×R.

A pattern can therefore be defined as a sub-matrix within the matrix, where the sub-matrix has dimensions of W×R stripe groups.

In other words, consider a pattern comprising a sequence of stripe groups from 0 to N−1, where W×R=N. Thus, the parameter W sets out that the pattern will comprise stripe groups 0 to W−1 in the first row of the pattern, W to 2*W×1 in the second row of the pattern, and so forth until groups (R−1)*W to R*W−1 in the final row of the pattern, where R*W−1=N−1.

In embodiments, W is specified as the largest whole number of stripe-groups that will fit into the device count. For instance, if the stripe-group size is 10 units and the number of drives is 39, W is equal to int(39/10)=3.

The width W can be larger than this, but this may cause skipping in the access pattern. The width W can also be less, though this will reduce the amount of parallelism that can be achieved when presented with low-queue-depth IO.

FIG. 6 illustrates a basic example of this. FIG. 6 shows a 20 drive matrix in which the stripe groups comprise 4 data units and 2 parity units in a [20(4+2)] configuration. In FIG. 6, the matrix is arranged with a sequential pattern of stripe groups where, for each pattern, W=3 and R=3. Take, for example, pattern A illustrated. As shown, pattern A comprises W×R=9 stripe groups, each of six (4+2) units each.

Therefore, stripe groups 0 to 2 extend along the first row, then stripe groups 3 to 5 along the second row and so on. The pattern is then repeated for later stripe groups.

Different arrangements of W and R can be utilized to optimize the pattern layout for different configurations or end uses. FIGS. 7 and 8 illustrate the effect of W and R on the data patterns. FIG. 9 illustrates how the R and W can reduce to the conventional arrangement.

FIG. 7 shows a 29 drive matrix in which the stripe groups comprise 5 data units and 2 parity units in a [29(5+2)] configuration. The matrix of FIG. 7 is arranged with a sequential pattern of stripe groups where, for each pattern, W=1 and R=5. Therefore, each pattern comprises 1×5=5 stripe groups. Considering the first pattern (shown in a black box), only the first stripe group (stripe group 0) extends across the drives, with stripe groups 1 to 4 arranged below. In other words, individual units in stripe groups 0 to 4 are arranged sequentially along a row (i.e. on a given drive). This pattern is then repeated for all stripe groups.

In contrast, FIG. 8 shows a similar 29 drive matrix in which the stripe groups comprise 5 data units and 2 parity units in a [29(5+2)] configuration. However, the matrix of FIG. 8 is arranged with a sequential pattern of stripe groups where, for each pattern, W=3 and R=5. Therefore, each pattern comprises 3×5=15 stripe groups.

Considering the first pattern (shown in a black box), the first to third stripe groups (stripe groups 0 to 2) extends across the drives, with stripe groups 3 to 5 arranged below and so on. In other words, individual units in stripe groups 0, 3, 6, 9 and 12 are arranged sequentially along a row (i.e. on a given drive) in the pattern.

Finally, FIG. 9 is provided to contrast the above examples with a known arrangement. FIG. 9 shows a similar 29 drive matrix in which the stripe groups comprise 5 data units and 2 parity units in a [29(5+2)] configuration. However, the matrix of FIG. 9 comprises no pattern of stripe groups. In other words, W=1 and R=1. For these values of R and W, the situation reduces to that known in the art where stripe groups are not laid out in any pattern and are just distributed sequentially across the whole matrix.

Considering the first pattern (shown in a black box), the first to third stripe groups (stripe groups 0 to 2) extends across the drives, with stripe groups 3 to 5 arranged below and so on. In other words, individual units in stripe groups 0, 3, 6, 9 and 12 are arranged sequentially along a row (i.e. on a given drive) in the pattern.

In the examples of FIGS. 7 and 8, stripe groups are aligned onto the same hard disks as required. As shown, the purpose of W is to increase parallelism across the drives. This has benefits for drive arrays which receive only a small amount of I/O requests. Consider, for example, that there is only sufficient client I/O data to fill three stripe groups. In the case of FIG. 7, where W=1, then only 7 of the hard disks would be accessed.

However, where W=3 as shown in FIG. 8, 21 of the hard disks can be utilized without losing any of the benefits of the improved recovery performance.

W becomes a more critical parameter as the value of R increases. Consider a situation where W=1 and R is increased. As R increases, more and more client I/O data is required to fill the pattern of repeated stripes and begin to access a different set of hard disks. In an extreme case, a bottleneck may be created on a few disks due to the lack of parallelism.

FIG. 10 shows the benefit of this approach in practice. FIG. 10 is similar to FIG. 4 and shows a 35 hard drive, 8+2 PDRAID arrangement in accordance an embodiment of the present invention. In this example, W=3 and R=5.

Again, in this example, hard drive 4 has failed (as shown by the dark column). To reconstruct the data on the failed drive 4, it is necessary to access all of the units highlighted in grey.

However, in contrast to the configuration as shown in FIG. 4, there are no longer single units of data or small clusters. Instead, the units that need to be read as part of the reconstruction are arranged in sequential order in groups of five or more units in the columns which each represent a drive which needs to be accessed to rebuild the missing data.

Thus, in this configuration, the hard disk read ahead mechanism can be utilized and cached read ahead data will be utilized. Thus, the arrangement enables much faster rebuilding of the drive.

The benefit of read ahead caching is, in general, proportional to R. In other words, as R increases, the recovery speed increases. However, there is a natural limit in that this criterion applies only as long as all of the hard drives are accessed uniformly. For instance, consider the example in the limit R→∞. In this situation, the entire configuration is essentially one row repeated indefinitely. Therefore, only a small subset of the total number of hard disks will be accessed during recovery. To consider this, imagine the first row of FIG. 10 being repeated an infinite number of times. Only 9 of the total number of hard disks will ever be read—those that are shaded grey as being required in the recovery.

Whilst the arrangements described above in relation to the present invention enable hard disk read ahead to be leveraged, further advantages are conferred by sequentially repeating patterns, where each pattern comprises a plurality of stripe groups, as set out in the above embodiments. For example, such patterns are generally beneficial due to reduce gaps and seeking latencies in the workload.

A further advantage of this approach is that when matrix permutations are cached, the cost of calculating a permutation is amortized over a larger space given a sequential access pattern such as repair.

Consider for instance a [41(8+2+2)] configuration with 128 KiB chunks and R=1. Within the MD RAID architecture, a single matrix equates to 1248 striplets, the smallest unit of access in a repair workload. Therefore given a repair workload, a permutation is calculated once per every 1238 striplets that are accessed. When R=8, then the same ratio is 1:9984. Equivalently there are ⅛ the number of permutation calculations.

FIG. 11 shows an example of how recovery repair performance improves as the repeating parameter R increases. This test was conducted with a 41 hard drive PDRAID array, with stripe groups comprising 10 units-8 data and 2 parity. A single distributed spare is provided, defining this test example as a [41(8+2+1)R×1] PDRAID array.

FIG. 11 shows the repair rate in MiB/s as a function of time in minutes. Only the first 15 minutes of repair are shown. The data shown is for values of R=1, 2, 4, 8, 16 and 32 in increasing order. W is set to 1 in this example.

Since the stripe-group size of 10 (8+2) divides evenly into 40 (41 hard drives minus 1 distributed spare), the rows-per-matrix count is exactly one. In other words, a single matrix is one chunk deep (128 KiB).

As a result of this, the repair workload appears random when R=1 and permutations are very frequently generated. However, as R is increased, the repair workload appears more sequential and fewer permutations are calculated per second.

Thus, the average repair rate performance for R=1 is 146 MiB/s whereas with R=32 the average performance is 417 MiB/s. This represents a significant gain, a 285.85% increase in repair performance.

FIG. 12 shows a similar graph illustrating how recovery repair performance improves as R increases. This test was conducted with a 41 hard drive PDRAID array, with stripe groups comprising 10 units-8 data and 2 parity. Two distributed spares are provided, defining this test example as a standard [41(8+2+2)R×1] configuration. This is the configuration implemented in a "ClustorStor" arrangement.

In this example, R=1, 2, 4 and 8. W is again set to 1. Values of R greater than 8 are not used because R=8 because reaches the back-end SAS hardware limit of the test configuration.

Again, only the first 15 minutes of repair performance for each test are shown. Since the parity-group size of 10 (8+2) is coprime with 39 (41 hard drives minus 2 distributed spares), the rows-per-matrix count is also 10. Or in other words, a single matrix is ten chunks deep (1.25 MiB).

Therefore, the repair workload will appear mostly random when R=1 and possess only a small amount of coherency. As R increases, the repair workload appears more sequential and fewer permutations are calculated per second.

In FIG. 12, the average repair rate performance for R=1 is 299 MiB/s whereas with R=8, the average performance is 420 MiB/s. This also represents a significant gain, a 140.38% increase in repair performance.

A method according to an embodiment of the present invention will now be described with reference to FIG. 13. FIG. 13 shows a flow chart for carrying out the method according to an embodiment.

Step 200: Initialize System

At step 200, the mapping system is initialized. The mapping system may comprise a software application run on the storage system 100 e.g. as a software application 116 run on the operating system 118. Alternatively, and non-exhaustively, the mapping system may be run from a remote server or from hardware or firmware.

The mapping system is operable to configure the structure of a RAID array 108 and to specify key parameters of the configuration metadata. The method then proceeds to step 202.

Step 202: Define Matrices

In step 202, the size and configuration of a matrix is defined. The number of drives, unit size and stripe group parameters (e.g. P, N, K and A) are defined. The matrix may include all the available units on a RAID array or a matrix may comprise only a subset thereof. Matrix numbers may be assigned in this step. The method proceeds to step 204.

Step 204: Define Pattern Parameters

At step 204, the pattern parameters R and W are defined. In accordance with the present invention, the stripe groups in an array are arranged in patterns, where each pattern comprises a plurality of stripe groups.

R and W are specified in this step and define the width and repetition of the pattern containing a plurality of stripe groups.

When coded, the plurality of patterns comprising a plurality of stripe groups is defined as a matrix of w columns and infinite rows. Since there are R repeated patterns, each set of R rows is a "repeat set". The method proceeds to step 206.

Step 206: Assign Stripe Groups to Matrix

In step 206, the stripe groups are assigned to the or each matrix in accordance with the W and R parameters set out above. This defines the number and configuration of the stripe groups per individual pattern which will then be propagated through the matrix. The method proceeds to step 208.

Step 208: Convert to Target-Address Space

In step 208, the stripe groups in each matrix are assigned a logical target (i.e. the hard drive upon which a given unit within a stripe group is stored) and a column frame offset (i.e. the location of the unit within the data arrangement on the given hard drive) for use by the RAID hardware.

Step 210: Permute

As discussed above, the columns of the matrix can safely be permuted between hard drives. In other words, the columns of data defined in previous steps can pseudo-randomly be assigned to different hard drives to improve the distribution of data on the RAID array.

The permutation in step 210 involves a permutation of the logical target objects. A mapping is then required to ensure that the logical target objects map to the correct physical target objects (i.e. the hard drives).

Variations of the above embodiments will be apparent to the skilled person. The precise configuration of hardware and software components may differ and still fall within the scope of the present invention.

Additionally, whilst the present embodiment relates to arrangements operating predominantly in off-host firmware or software (e.g. on the RAID controller), an on-host arrangement could be used.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:

1. A method comprising:
arranging a plurality of storage devices in communication with a control circuit to form a combined memory space configured for storage of stripe groups across multiple ones of the plurality of storage devices, each stripe group comprising a distributed data set having a plurality of user data units and at least one parity unit;
using the control circuit a data structure comprising a two dimensional map of the combined memory space with each of the storage devices represented along a first dimension of the two dimensional map and equally-offset sequential units of storage capacity of the plurality of storage devices represented along a second dimension of the two dimensional map, each of the equally-offset sequential units of storage capacity substantially equal in size to a selected one of the plurality of user data units or at least one parity unit in each stripe group;
defining, by the control circuit, a stripe group set comprising a plurality of sequential stripe coups arranged into a W x R pattern across the storage devices with W comprising a plural number width parameter representing a total number of the plurality of sequential stripe groups arranged across a common set of the storage devices in successive sequential units of storage capacity in the first dimension and R comprising a plural number repeating parameter representing a total number of different sets of the storage devices across which the plurality of sequential stripe groups are stored in the second dimension;
populating, by the control circuit, the data structure by repeating the W×R pattern within the two dimensional map in both the first dimension and the second dimension to define target locations for host data; and
using the control circuit to arrange data received from a host into host data stripe groups and to direct storage of the host data stripe groups to the storage devices in accordance with the populated data structure.

2. The method of claim 1, wherein the W plural number width parameter identifies a total number of logically adjacent storage devices in the memory space each receiving a selected one of a user data unit or a parity unit in a selected distributed data set, and the R plural number repeating parameter identifies a total number of distributed data sets having respective user data units and parity units written across the total number of logically adjacent storage devices.

3. The method of claim 2, wherein the W plural number width parameter is selected as the integer of the number of storage devices in the memory space divided by the total number of user data units and parity units in each distributed data set.

4. The method of claim 1, wherein the W plural number width parameter is at least five and the R plural number repeating parameter is at least three.

5. The method of claim 4, wherein the W plural number width parameter is at least ten and the R plural number repeating parameter is at least 8.

6. The method of 1, wherein each of the distributed data sets stored by the memory space are arranged to have the same RAID architecture.

7. The method of claim 1, wherein the storage devices comprise hard disk drives forming part of the RAID array and the R plural number repeating parameter is set based on a parameter equal to the read ahead disk size of one or more of the hard disk drives divided by the size of an individual user data unit or an individual parity unit on said one or more hard disk drives.

8. The method of claim 1, wherein said storage devices comprise hard disk drives forming part of the RAID array.

9. The method of claim 1, wherein the method further comprises arranging the two dimensional map as a series of rows and columns, the rows extending in the first dimension and the columns extending in the second dimension, each column representing a different one of the storage devices in the memory space.

10. The method of claim 9, further comprising applying a pseudo-random permutation of the data storage devices so that each column in the two dimensional map is randomly assigned to a selected one of the data storage devices in the memory space.

11. The method of claim 1, wherein each of distributed data sets stored by the memory space comprises a total combined number of user data units and parity units equal to W with each of the user data units and parity units comprising a same overall data size.

12. An apparatus comprising:
a plurality of data storage devices arranged to form a combined memory space configured for storage of stripe groups across multiple ones of the plurality of storage devices, each stripe group comprising a distributed data set having a plurality of user data units and at least one parity unit;
a local memory; and
a control circuit configured to generate, in the memory, a data structure comprising a two dimensional map of the combined memory space with each of the storage devices represented along a first dimension of the two dimensional map and equally-offset sequential units of storage capacity of the plurality of storage devices represented along a second dimension of the two dimensional map, each of the equally-offset sequential units of storage capacity equal in size to a selected one of the plurality of user data units or at least one parity unit in each stripe group, the control circuit further configured to define a stripe group set comprising a plurality of sequential stripe groups arranged into a W x R pattern across the storage devices with W representing a total number of the plurality of sequential stripe groups arranged across a common set of the storage devices in successive sequential units of storage capacity in the first dimension and R representing a total number of different sets of the storage devices across which the plurality of sequential stripe groups are stored in the second dimension, the control circuit further configured to populate the data structure by repeating the W×R pattern within the two dimensional map in both the first dimension and the second dimension to define target locations for host data, and to arrange data received from a host into host data stripe groups and to direct storage of the host data stripe groups to the storage devices in accordance with the populated data structure.

13. The apparatus of claim 12, wherein each of the data storage devices comprises a hard disk drive and the control circuit comprises a programmable processor having programming stored in the local memory executable by the programmable processor.

14. The apparatus of claim 12, wherein W identifies a total number of logically adjacent storage devices in the memory space each receiving a selected one of a user data unit or a parity unit in a selected distributed data set, and R identifies a total number of distributed data sets having respective user data units and parity units written across the total number of logically adjacent storage devices.

15. The apparatus of claim 12, wherein W is selected as the integer of the number of storage devices in the memory space divided by the total number of user data units and parity units in each distributed data set.

16. The apparatus of claim 12, wherein W is at least five and R is at least three.

17. The apparatus of claim 16, wherein the total number of data storage devices is at least 15 so that at least three sets of the W×R pattern extend across the data structure in the first direction.

18. The apparatus of claim 12, wherein each distributed data set stored by the memory space has the same RAID architecture selected from a group consisting of RAID 3, RAID 4, RAID 5 and RAID 6.

19. An apparatus comprising:
a local memory device; and
a programmable processor having associated programming stored in the local memory device which, when executed by the processor, is operative to:
  arrange a plurality of storage devices to form a combined memory space configured for storage of RAID stripe groups across multiple ones of the plurality of storage devices, each stripe group comprising a distributed data set having a plurality of user data units and at least one parity unit;
  generate a data structure comprising a two dimensional map of the combined memory space with each of the storage devices represented along a first dimension of the two dimensional map and equally-offset sequential units of storage capacity of the plurality of storage devices represented along a second dimension of the two dimensional map, each of the equally-offset sequential units of storage capacity equal in size to a selected one of the plurality of user data units or at least one parity unit in each stripe group;
  define a RAID stripe group set comprising a plurality of sequential stripe groups arranged into a W×R pattern across the storage devices with W comprising a plural number width parameter representing a total number of the plurality of sequential stripe groups arranged across a common set of the storage devices in successive sequential units of storage capacity in the first dimension and R comprising a plural number repeating parameter representing a total number of different sets of the storage devices across which the plurality of sequential stripe groups are stored in the second dimension;
  populate the data structure by repeating the W×R pattern within the two dimensional map in both the first dimension and the second dimension to define target locations for host data; and
  use the control circuit to arrange data received from a host into host data stripe groups and to direct storage of the host data stripe groups to the storage devices in accordance with the populated data structure.

20. The apparatus of claim 19, wherein the W plural number width parameter identifies a total number of logically adjacent storage devices in the memory space each receiving a selected one of a user data unit or a parity unit in a selected distributed data set, and the R plural number repeating parameter identifies a total number of distributed data sets having respective user data units and parity units written across the total number of logically adjacent storage devices.

* * * * *